Jan. 3, 1950 T. F. WOLD 2,493,431
FISH LURE
Filed May 3, 1945

Inventor
Thomas F. Wold

By Clarence A. O'Brien
and Harvey B. Jackson
Attorneys

Patented Jan. 3, 1950

2,493,431

UNITED STATES PATENT OFFICE 2,493,431

FISH LURE

Thomas F. Wold, Portland, Oreg.

Application May 3, 1945, Serial No. 591,696

1 Claim. (Cl. 43—42.19)

This invention relates to lures for fishing and has for its object to provide a spinning lure simulating an earth or blood worm.

Another object of the invention is to provide a spinner adapted to be stamped from a sheet of flat material, such as sheet metal, sheet plastic, sheet rubber, or other like material of a flexible nature.

A further object of the invention is to provide a spiral lure having a tapering body.

A still further object of this invention is to provide a spiral lure rotatably mounted upon a shaft either rigid or somewhat flexible.

Other features and advantages will become more readily apparent from the following description and the accompanying illustrative drawings in which.

Figure 1:
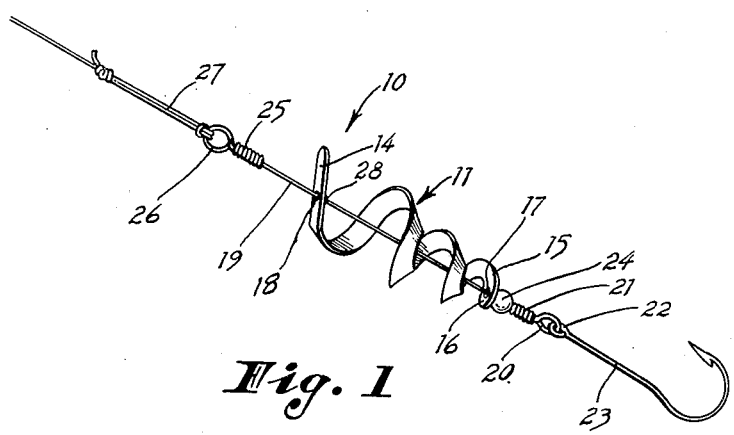
Figure 1 is a perspective view of my invention.
Figure 2:
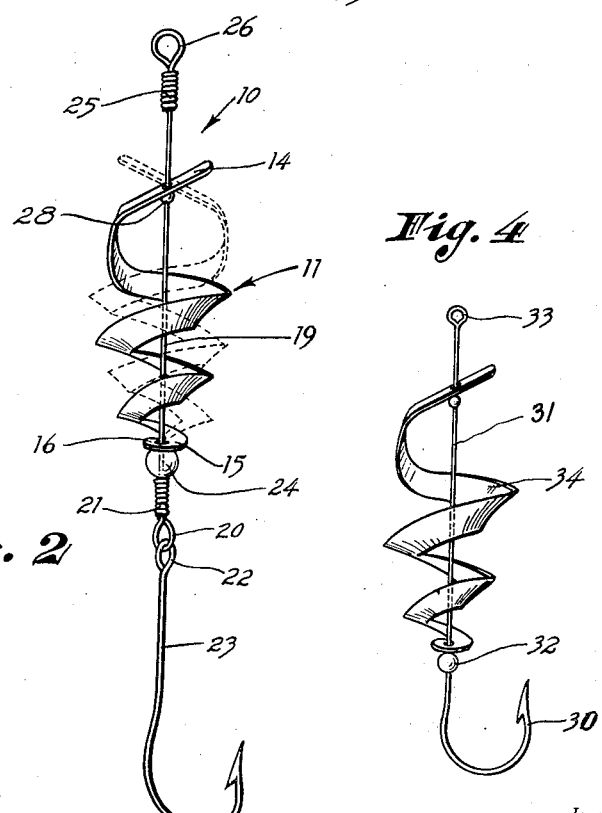
Figure 2 is an elevational view of my swirling lure.

In the drawings and following specification I use the same reference characters to designate the same elements throughout and in which 10 indicates my improved fish lure, which is drawn out from a blank 12 of sheet material cut with a spiral slit 13 which originates near the center of the body and terminates at the edge thereof. Extending outwardly from the periphery of the body at the outer terminal of the spiral slit 13 is a head 14 and the inner end of the slit 13 terminates short of the center of the body to form a bearing plate 15 formed with a perforation 17 which cooperates in a manner to be more fully hereinafter described with a perforation 18 formed in the head 14.

When the blank 12 is drawn out it assumes the shape of a spiral which diminishes in diameter toward the bearing plate 15. Threaded through the perforations 17 and 18, is a shaft 19. As the member 12 is drawn out it is somewhat twisted or cupped as illustrated. It will be noted that the plane of each convolution of the spinner, which is in the form of a generally conical helix, is disposed obliquely of the axis of the helix. The wire shaft 19 is provided at its lower end with a loop 20 by returning its terminal end and twisting it upon itself as at 21. To the loop 20 is attached the eye 22 of a fish hook shank 23. Also threaded on member 19 is a sphere or like abutment 24 (preferably painted a bright red) upon the upper convex surface of which the disk 16, seats. This bearing plate 15 is preferably pressed into concavo-convex form and it is so positioned on the shaft 19 that its convex surface seats upon the said sphere, thus reducing friction to a minimum.

The upper terminal 25 of shaft 19 is also formed with a loop or eye 26, to which a fishing line 27, is attached. The blank 12, may be cut from any suitable sheet material such as any bright, shining metal which will catch and reflect the light in order to attract the attention of the fish, or the blank may be painted a bright color, or the color of a worm which it will very closely resemble when casting, trolling or fishing in a current. Because of its swirling movement, caused by the water pressure passing through and between its graduated convolutions, a motion very like a worm endeavoring to reach the surface is effected, causing a fish to immediately strike rather than tarry to nibble at the bait on the hook. Should the spiral be formed of rubber, a frictionally held adjustable bead 28 may be threaded on the upper end of the member 19 just under the head 14 of the spiral in order to overcome any possibility of water pressure collapsing the spiral. This nature of spiral would simulate wiggling as well as it would spin.

It is obvious, of course, that these lures may be made in various sizes for luring various fishes according to the size of the kind sought. It is also obvious that they may be of a suitable color attractive to the fish sought.

Figure 4:
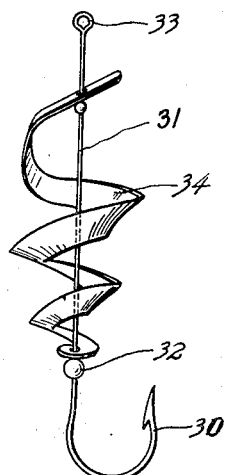
Figure 4 is a view similar to Figure 2, illustrating a slight modification.
Figure 3:
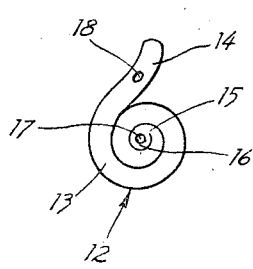
Figure 3 is a plan view of a blank of the device before being drawn out into shape.

However, in Figure 4 of the drawings I illustrate a modification of the invention which is more suitable for the much smaller fish. In this form I provide a fish hook 30 having a somewhat longer shank 31 than is usually provided, which shank is provided with an enlargement 32 between which and the eye 33, a spiral 34 is mounted. This spiral is formed in every respect as is spiral 11, except as to its diminutive size. This spiral is threaded on the shank 31 before the eye 33 is formed.

It is thought that persons skilled in the art to which the invention relates will be able to obtain a clear understanding of the invention after considering the description in connection with the drawings. Therefore, a more lengthy description is regarded as unnecessary.

Minor changes in shape, size and rearrangement of details and parts such as come within the purview of the invention claimed may be resorted to, in actual practice, if desired.

Having now described my invention that which

I claim as new and desire to procure by Letters Patent is:

In a fish lure, a shaft having means to connect one end thereof to a fishing line, a fish hook attached to the other end of said shaft, a spinner journalled on said shaft, said spinner being in the form of a generally conical helix having a plurality of convolutions, the plane of each of which is disposed obliquely of the axis of the helix, the inner end of the helix having an opening forming a bearing on the shaft adjacent the hook, the outer end of the helix being provided with an inwardly projecting extension having an opening forming a bearing on the shaft adjacent the end thereof adapted to be connected to a fishing line, and an abutment on the shaft for the inner end of the helix.

THOMAS F. WOLD.

REFERENCES CITED

The following references are of record in the file of this patent:

UNITED STATES PATENTS

| Number | Name | Date |
|---|---|---|
| 121,182 | Mann | Nov. 21, 1871 |
| 747,976 | Junod | Dec. 29, 1903 |
| 1,530,343 | Bayer | Mar. 17, 1925 |
| 1,554,951 | Bryan | Sept. 22, 1925 |
| 1,666,072 | Schilpp | Apr. 17, 1928 |
| 1,669,748 | Greger | May 15, 1928 |
| 1,836,650 | Davenport | Dec. 15, 1931 |
| 1,867,893 | Roth | July 19, 1932 |

FOREIGN PATENTS

| Number | Country | Date |
|---|---|---|
| 4,122 | Great Britain | Feb. 27, 1894 |